(12) United States Patent
Lee et al.

(10) Patent No.: US 11,816,922 B2
(45) Date of Patent: Nov. 14, 2023

(54) FINGERPRINT EXTRACTION APPARATUS AND METHOD

(71) Applicant: SEOUL NATIONAL UNIVERSITY R&DB FOUNDATION, Seoul (KR)

(72) Inventors: Byoung Ho Lee, Seoul (KR); Jae Bum Cho, Gwangmyeong-si (KR); Dong Heon Yoo, Daejeon (KR); Min Seok Chae, Seoul (KR); Ju Hyun Lee, Seoul (KR)

(73) Assignee: Seoul National University R&DB Foundation, Seoul (KR)

( * ) Notice: Subject to any disclaimer, the term of this patent is extended or adjusted under 35 U.S.C. 154(b) by 0 days.

(21) Appl. No.: 16/975,244

(22) PCT Filed: Dec. 31, 2019

(86) PCT No.: PCT/KR2019/018806
§ 371 (c)(1),
(2) Date: Aug. 24, 2020

(87) PCT Pub. No.: WO2021/125422
PCT Pub. Date: Jun. 24, 2021

(65) Prior Publication Data
US 2023/0118211 A1  Apr. 20, 2023

(30) Foreign Application Priority Data
Dec. 19, 2019  (KR) .................. 10-2019-0171036

(51) Int. Cl.
*G06V 40/12* (2022.01)
*G06V 10/70* (2022.01)
*G06T 11/00* (2006.01)

(52) U.S. Cl.
CPC .......... *G06V 40/1359* (2022.01); *G06T 11/00* (2013.01); *G06V 10/70* (2022.01)

(58) Field of Classification Search
CPC .......................... G06V 40/1359; G06V 10/70
See application file for complete search history.

(56) References Cited

U.S. PATENT DOCUMENTS

| 10,540,798 B1* | 1/2020 | Walters | ................. G06N 3/088 |
| 2016/0239701 A1* | 8/2016 | Lee | .................... G06V 40/1347 |

(Continued)

FOREIGN PATENT DOCUMENTS

| KR | 2003-0086396 A | 11/2003 |
| KR | 2011-0018598 A | 2/2011 |

(Continued)

OTHER PUBLICATIONS

International Search Report and Written Opinion dated Sep. 16, 2020 in International Patent Application No. PCT/KR2019/018806, filed Dec. 31, 2019, 7 pages. (No English translation provided).

*Primary Examiner* — Yi Yang
(74) *Attorney, Agent, or Firm* — KILPATRICK TOWNSEND & STOCKTON LLP

(57) ABSTRACT

A fingerprint extraction apparatus includes a fingerprint generation module configured to generate first and second virtual fingerprint images, perform primary image processing on the first virtual fingerprint image and primary and secondary image processing on the second virtual fingerprint images, and generate virtual overlapped fingerprint images by combining the first and second virtual fingerprint images on which image processing is performed; a machine learning module configured to generate a learning model by performing machine learning using the virtual overlapped fingerprint images as input data; and a fingerprint extraction module configured to extract a fingerprint located vertically on a center of a real image by inputting the real image to a target fingerprint extraction learning model, and the primary image processing comprises image processing on a curve forming (Continued)

a fingerprint, and the secondary image processing comprises image processing on a location of the fingerprint in the image.

12 Claims, 7 Drawing Sheets

(56) References Cited

U.S. PATENT DOCUMENTS

| | | | |
|---|---|---|---|
| 2018/0032788 A1* | 2/2018 | Krenzer | G06V 40/67 |
| 2018/0173998 A1* | 6/2018 | Zare | G06F 18/214 |
| 2018/0373917 A1* | 12/2018 | Sheik-Nainar | G06V 40/1347 |
| 2020/0034663 A1* | 1/2020 | Michiels | G06F 11/10 |
| 2020/0082270 A1* | 3/2020 | Gu | G06N 5/045 |

FOREIGN PATENT DOCUMENTS

| | | |
|---|---|---|
| KR | 2011-0036407 A | 4/2011 |
| KR | 10-1460964 B1 | 11/2014 |
| KR | 10-1881505 B1 | 7/2018 |

* cited by examiner

FINGERPRINT EXTRACTION APPARATUS AND METHOD

TECHNICAL FIELD

The present disclosure relates to a fingerprint extraction apparatus and method using machine learning.

BACKGROUND ART

In general, technologies for obtaining and analyzing fingerprints are used to verify an individual's identity. In particular, fingerprints taken at crime scenes may be easily used as evidence. However, when collected fingerprints overlap, it is necessary to extract some fingerprints from the overlapped fingerprints.

As technologies for extracting some fingerprints from the overlapped fingerprints, a technology capable of separating the overlapped fingerprints based on the direction of ridges of each fingerprint in an image photographed in a visible light band, a technology capable of separating the overlapped fingerprints based on the fluorescence intensity of fingerprints detected for various wavelength bands by irradiating laser on the overlapped fingerprints, a technology capable of separating the overlapped fingerprints based on spectrums of the overlapped fingerprints obtained through mass spectrometry, etc. are used.

The technology based on the direction of the ridges of each fingerprint is a technology capable of separating direction components of overlapped ridges based on direction components of non-overlapped ridges of the fingerprints. When directions of the overlapped ridges are ambiguous, the overlapped fingerprints may not be accurately separated.

The technology based on the fluorescence intensity of fingerprints by irradiating a laser has limited use because it is valid only when the overlapped fingerprints are formed with a time difference therebetween.

The technology based on the spectrums of the overlapped fingerprints obtained through mass spectrometry may damage a sample in a process of ionizing the sample of the overlapped fingerprints.

The technology capable of separating the overlapped fingerprints is required in the overall field of separating and collecting target fingerprints when fingerprints overlap or when fingerprints overlap with other patterns, such as in a criminal field as well as in a biometrics field.

DESCRIPTION OF EMBODIMENTS

Technical Problem

Provided are a quicker and more accurate fingerprint extraction apparatus and method.

Solution to Problem

According to an aspect of the present disclosure, a fingerprint extraction apparatus includes a fingerprint generation module configured to generate at least one first virtual fingerprint image comprising a fingerprint located vertically on a center of an image, and a plurality of second virtual fingerprint images different from the at least one first virtual fingerprint image, perform primary image processing on the at least one first virtual fingerprint image, perform at least one of primary image processing and secondary image processing on each of the plurality of second virtual fingerprint images, and generate a plurality of virtual overlapped fingerprint images by combining the at least one first virtual fingerprint image on which primary image processing is performed and the plurality of second virtual fingerprint images on which at least one of primary image processing and secondary image processing is performed; a machine learning module configured to generate a learning model for extracting a target fingerprint by performing machine learning using the plurality of virtual overlapped fingerprint images as input data and the at least one first virtual fingerprint image as output data; and a fingerprint extraction module configured to extract a fingerprint located vertically on a center of a real image by inputting the real image to a target fingerprint extraction learning model, and primary image processing comprises image processing on a curve forming a fingerprint, and secondary image processing comprises image processing on a location of the fingerprint in the image.

The fingerprint generation module may further generate a plurality of virtual background images, and generate the plurality of virtual overlapped fingerprint images by combining the at least one first virtual fingerprint image on which primary image processing is performed, the plurality of second virtual fingerprint images on which at least one of primary image processing and secondary image processing is performed, and the plurality of virtual background images, and each of the plurality of virtual background images may include at least one pattern other than the fingerprint.

Primary image processing may include at least one of adding a curve of the fingerprint, removing a curve of the fingerprint, changing a thickness of the fingerprint, and changing the sharpness of the fingerprint, and secondary image processing may include at least one of rotating the fingerprint and inverting the fingerprint.

Each of the plurality of second virtual fingerprint images may include a fingerprint that is not located on the center of the image or is not located vertically on the image.

A shape of the fingerprint included in each of the plurality of second virtual fingerprint images may be different from a shape of the fingerprint included in the at least one first virtual fingerprint image.

A shape of the fingerprint included in each of the plurality of second virtual fingerprint images may be the same as a shape of the fingerprint included in the at least one first virtual fingerprint image.

The fingerprint extraction module may determine a target fingerprint from the real image, pre-process the real image such that the target fingerprint is vertically located on the center of the real image, and input the pre-processed real image into the learning model to extract the target fingerprint.

According to another aspect of the present disclosure, a fingerprint extraction method includes generating at least one first virtual fingerprint image comprising a fingerprint located vertically on a center of an image; generating a plurality of second virtual fingerprint images different from the at least one first virtual fingerprint image; performing primary image processing on the at least one first virtual fingerprint image; performing at least one of primary image processing and secondary image processing on each of the plurality of second virtual fingerprint images; generating a plurality of virtual overlapped fingerprint images by combining the at least one first virtual fingerprint image on which primary image processing is performed and the plurality of second virtual fingerprint images on which at least one of primary image processing and secondary image processing is performed; generating a learning model for extracting a target fingerprint by performing machine learning using the plurality of virtual overlapped fingerprint images as input data and the at least one first virtual fingerprint image as output data; and extracting a fingerprint located vertically on a center of a real image by inputting the real image to a target fingerprint extraction learning model, and primary image processing includes image processing on a curve forming a fingerprint, and secondary image processing comprises image processing on a location of the fingerprint in the image.

The fingerprint extraction method may further include generating a plurality of virtual background images, and the generating of the plurality of virtual overlapped fingerprint images includes generating the plurality of virtual overlapped fingerprint images by combining the at least one first virtual fingerprint image on which primary image processing is performed, the plurality of second virtual fingerprint images on which at least one of primary image processing and secondary image processing is performed, and the plurality of virtual background images, and each of the plurality of virtual background images includes at least one pattern other than the fingerprint.

Primary image processing may include at least one of adding a curve of the fingerprint, removing a curve of the fingerprint, changing a thickness of the fingerprint, and changing the sharpness of the fingerprint, and secondary image processing comprises at least one of rotating the fingerprint and inverting the fingerprint.

Each of the plurality of second virtual fingerprint images may include a fingerprint that is not located on the center of the image or is not located vertically on the image.

A shape of the fingerprint included in each of the plurality of second virtual fingerprint images may be different from a shape of the fingerprint included in the at least one first virtual fingerprint image.

A shape of the fingerprint included in each of the plurality of second virtual fingerprint images may be the same as a shape of the fingerprint included in the at least one first virtual fingerprint image.

The extracting of the fingerprint may include determining a target fingerprint from the real image; pre-processing the real image such that the target fingerprint is vertically located on the center of the real image; and inputting the pre-processed real image into the learning model to extract the target fingerprint.

Advantageous Effects of Disclosure

According to the present disclosure, a fingerprint having an unclear direction of a ridge may be quickly and smoothly extracted.

In addition, even if the background includes patterns having various directions, the fingerprint may be quickly and smoothly extracted from the background.

In addition, because the fingerprint is extracted using an image, there is no fear of damage to a sample, and because the fingerprint is extracted based on machine learning, the fingerprint may be extracted regardless of the formation time of the fingerprint.

That is, according to embodiments of the present disclosure, quicker and more accurate fingerprint extraction apparatus and method may be provided.

BEST MODE

Figure 1:
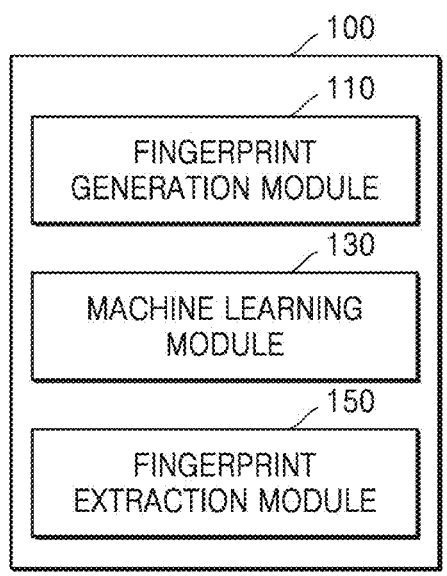
FIG. 1 is a diagram illustrating a structure of a fingerprint extraction apparatus according to an embodiment of the present disclosure.

A fingerprint extraction apparatus includes a fingerprint generation module configured to generate at least one first virtual fingerprint image comprising a fingerprint located vertically on a center of an image, and a plurality of second virtual fingerprint images different from the at least one first virtual fingerprint image, perform primary image processing on the at least one first virtual fingerprint image, perform at least one of primary image processing and secondary image processing on each of the plurality of second virtual fingerprint images, and generate a plurality of virtual overlapped fingerprint images by combining the at least one first virtual fingerprint image on which the primary image processing is performed and the plurality of second virtual fingerprint images on which the at least one of primary image processing and secondary image processing is performed; a machine learning module configured to generate a learning model for extracting a target fingerprint by performing machine learning using the plurality of virtual overlapped fingerprint images as input data and the at least one first virtual fingerprint image as output data; and a fingerprint extraction module configured to extract a fingerprint located vertically on a center of a real image by inputting the real image to a target fingerprint extraction learning model, and the primary image processing comprises image processing on a curve forming a fingerprint, and the secondary image processing comprises image processing on a location of the fingerprint in the image.

Mode of Disclosure

As the disclosure allows for various changes and numerous embodiments, exemplary embodiments will be illustrated in the drawings and described in detail in the written description. However, this is not intended to limit the present disclosure to particular modes of practice, and it is to be appreciated that all changes, equivalents, and substitutes that do not depart from the spirit and technical scope of the present disclosure are encompassed in the present disclosure. In the description of the present disclosure, certain detailed explanations of the related art are omitted when it is deemed that they may unnecessarily obscure the essence of the disclosure.

While such terms as "first," "second," etc., may be used to describe various components, such components must not be limited to the above terms. The above terms are used only to distinguish one component from another.

The terms used in the present specification are merely used to describe exemplary embodiments, and are not intended to limit the present disclosure. An expression used in the singular encompasses the expression of the plural, unless it has a clearly different meaning in the context. In the present specification, it is to be understood that the terms such as "including", "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

The present disclosure may be described in terms of functional block components and various processing steps. Such functional blocks may be realized by any number of hardware and/or software components configured to perform the specified functions. For example, the present disclosure may employ various integrated circuit (IC) components, e.g., memory elements, processing elements, logic elements, look-up tables, and the like, which may carry out a variety of functions under the control of one or more microprocessors or other control devices. Similarly, where the elements of the present disclosure are implemented using software programming or software elements, the disclosure may be implemented with any programming or scripting language such as C, C++, Java, assembler language, or the like, with the various algorithms being implemented with any combination of data structures, objects, processes, routines or other programming elements. Functional aspects may be implemented in algorithms that are executed on one or more processors. Furthermore, the present disclosure could employ any number of conventional techniques for electronics configuration, signal processing and/or control, data processing and the like. The words "mechanism", "element", "means", and "configuration" are used broadly and are not limited to mechanical or physical embodiments. The words may include software routines in conjunction with processors, etc.

FIG. 1 is a diagram illustrating a structure of a fingerprint extraction apparatus according to an embodiment of the present disclosure.

Referring to FIG. 1, a fingerprint extraction device 100 according to an embodiment of the present disclosure includes a fingerprint generation module 110, a machine learning module 130, and a fingerprint extraction module 150.

The fingerprint generation module 110 generates a plurality of virtually overlapped fingerprint images.

The fingerprint generation module 110 generates at least one first virtual fingerprint image including a fingerprint located vertically on the center of an image, and a plurality of second virtual fingerprint images different from the at least one first virtual fingerprint image, performs primary image processing on the at least one first virtual fingerprint image, performs at least one of primary image processing and secondary image processing on each of the plurality of second virtual fingerprint images, and combines the at least one first virtual fingerprint image on which primary image processing is performed and the plurality of second virtual fingerprint images on which at least one of primary image processing and secondary image processing is performed to generate a plurality of virtual overlapped fingerprint images.

The first virtual fingerprint image may refer to an image in which a fingerprint is vertically located on the center of the image. In other words, the first virtual fingerprint image may be an image in which the center of the fingerprint and the center of the image coincide, and the direction of a straight line connecting a pole of the uppermost parabola and a pole of the lowermost parabola of the fingerprint is a vertical direction in the image.

The center of the fingerprint may include at least one pixel. For example, the center of the fingerprint may include at least one pixel in which the longest line and the shortest line in the fingerprint overlap, at least one pixel in the middle of the longest line in the fingerprint, at least one pixel in the middle of the shortest line in the fingerprint, or at least one pixel in the middle of the straight line connecting the pole of the uppermost parabola and the pole of the lowermost parabola of the fingerprint, but is not limited thereto.

The center of the fingerprint may be a predetermined region including at least one pixel. For example, the center of the fingerprint may be a predetermined region further including a predetermined number of pixels around at least one pixel in which the longest line and the shortest line in the fingerprint overlap, at least one pixel in the middle of the longest line in the fingerprint, at least one pixel in the middle of the shortest line in the fingerprint, or at least one pixel in the middle of the straight line connecting the pole of the uppermost parabola and the pole of the lowermost parabola of the fingerprint. The shape of the center of the fingerprint formed in the predetermined region may be circular or polygonal, but is not limited thereto.

The center of the image may include at least one pixel. For example, the center of the image may include at least one pixel in which diagonal lines connecting vertices of an image that is a rectangle overlap, or at least one pixel corresponding to the center of an image that is a circle, but is not limited thereto.

The center of the image may be a predetermined region including at least one pixel. For example, the center of the image may be a predetermined region further including a predetermined number of pixels around at least one pixel in which diagonal lines connecting vertices of an image that is a rectangle overlap, or at least one pixel corresponding to the center of an image that is a circle. The shape of the center of the fingerprint formed in the predetermined region may be circular or polygonal, but is not limited thereto.

Coincidence of the center of the fingerprint and the center of the image may indicate coincidence of at least a part of the center of the fingerprint and at least a part of the center of the image. For example, that the center of the fingerprint and the center of the image coincide may mean that at least one pixel in the center of the fingerprint and at least one pixel in the center of the image overlap, or at least a part of a predetermined region that is the center of the fingerprint and at least a part of a predetermined region that is the center of the image overlap.

The fingerprint generation module 110 may generate a plurality of first virtual fingerprint images. At this time, the shapes of fingerprints of the plurality of first virtual fingerprint images may be different from each other. For example, the number, length, and thickness of ridges constituting the fingerprints of the plurality of first virtual fingerprint images may be different from each other.

Primary image processing may include image processing on a curve forming a fingerprint. For example, primary image processing may include at least one of adding a curve of a fingerprint, removing a curve of a fingerprint, changing the thickness of a fingerprint, and changing the sharpness of a fingerprint.

Primary image processing is performed on the first virtual fingerprint image, and thus the characteristics of a surface on which the fingerprint is formed or the characteristics of a force forming the fingerprint are reflected, such that a virtual fingerprint close to a real fingerprint may be implemented.

The second virtual fingerprint image may refer to an image in which the fingerprint is not located on the center of the image or is not vertically located. In other words, the second virtual fingerprint image may be an image in which the center of the fingerprint and the center of the image do not coincide, or the direction of a straight line connecting the pole of the uppermost parabola and the pole of the lowest parabola is not a vertical direction in the image.

The fingerprint generation module 110 may generate the plurality of second virtual fingerprint images. At this time, the shapes of fingerprints of the plurality of second virtual fingerprint images may be different from each other. For example, the number, length, and thickness of ridges constituting the fingerprints of the plurality of second virtual fingerprint images may be different from each other.

The shape of the fingerprint included in each of the plurality of second virtual fingerprint images may be different from the shape of the fingerprint included in each of the plurality of first virtual fingerprint images.

The shape of the fingerprint included in each of the plurality of second virtual fingerprint images may be the same as the shape of the fingerprint included in each of the plurality of first virtual fingerprint images. For example, the fingerprint generation module 110 may generate the first virtual fingerprint image in which the fingerprint is vertically located on the center of the image and the second virtual fingerprint image in which the same fingerprint as the fingerprint included in the first virtual fingerprint image is not located on the center of the image or is not vertically located.

Second secondary image processing may include image processing on the location of the fingerprint in the image. For example, secondary image processing may include at least one of rotating a fingerprint and inverting a fingerprint.

Primary image processing is performed on the second virtual fingerprint image, and thus the characteristics of a surface on which the fingerprint is formed or the characteristics of a force forming the fingerprint are reflected, such that a virtual fingerprint close to the real fingerprint may be implemented.

Secondary image processing is performed on the second virtual fingerprint image, and thus an image distinguished from the first virtual fingerprint image may be generated.

Meanwhile, the fingerprint generation module 110 may further generate a plurality of virtual background images, and may generate a plurality of virtual overlapped fingerprint images by combining the at least one first virtual fingerprint image on which primary image processing is performed, the plurality of second virtual fingerprint images on which at least one of primary image processing and secondary image processing is performed, and the plurality of virtual background images.

Each of the plurality of virtual background images may include at least one pattern other than the fingerprint.

On at least one pattern of each of the plurality of virtual background images, the fingerprint generation module 110 may perform image processing to change the shape of the pattern, change the thickness of the pattern, change the sharpness of the pattern, rotate the pattern, or invert the pattern.

The fingerprint generation module 110 may perform image processing to add contamination or stains to each of the plurality of virtual background images, but is not limited thereto.

The fingerprint generation module 110 may generate a plurality of virtual overlapped fingerprint images by combining the plurality of virtual background images on which image processing is performed and the at least one first virtual fingerprint image on which primary image processing is performed and the plurality of second virtual fingerprint images on which at least one of primary image processing and secondary image processing is performed.

Image processing is performed on the virtual background image, and thus a virtual background close to a real scene may be realized.

The at least one first virtual fingerprint image and the plurality of virtual overlapped fingerprint images generated by the fingerprint generation module 110 may constitute a learning data set. The learning data set generated by the fingerprint generation module 110 may be machine-learned by the machine learning module 130.

The machine learning module 130 generates a learning model for extracting a target fingerprint by performing machine learning using the plurality of virtual overlapped fingerprint images as input data and the at least one first virtual fingerprint image as output data.

The machine learning module 130 performs machine learning by using the plurality of virtual overlapped fingerprint images and the at least one first virtual fingerprint image as input data and output data of a deep learning algorithm such as a convolutional neural network (CNN) algorithm, thereby generating a learning model that extracts the fingerprint located vertically on the center of the image as a target fingerprint.

The fingerprint extraction module 150 extracts a fingerprint located vertically on the center of a real image by inputting the real image to a target fingerprint extraction learning model.

The real image may be an image obtained by photographing a fingerprint formed in the scene. In the real image, the fingerprint may not be located on the center of the image or vertically. In order to extract the fingerprint from the real image through the learning model generated by the machine learning module 130, it is necessary to pre-process the real image such that the fingerprint is located vertically on the center of the real image.

The fingerprint extraction module 150 may determine the target fingerprint from the real image, pre-process the real image such that the target fingerprint is vertically located on the center of the real image, and input the pre-processed real image into the learning model to extract the target fingerprint.

The fingerprint extraction module 150 may determine the target fingerprint based on user input or predetermined conditions, but is not limited thereto.

The fingerprint extraction module 150 may perform image pre-processing to rotate the real image such that the target fingerprint is located vertically on the real image, and/or image pre-processing to move and/or crop the real image such that the target fingerprint is located on the center of the real image, and thus the target fingerprint may be located vertically on the center of the real image.

As a result, the pre-processed real image may be an image in which the center of the target fingerprint and the center of the image coincide, and the direction of a straight line connecting the pole of the uppermost parabola and the pole of the lowermost parabola of the target fingerprint is a vertical direction in the image.

The fingerprint extraction module 150 may input the pre-processed real image such that the target fingerprint is vertically located on the center of the learning model, thereby more clearly specifying the target fingerprint to be extracted from the real image by the learning model.

According to the present embodiments, a fingerprint having an unclear direction of a ridge may be quickly and smoothly extracted.

In addition, even if the background includes patterns having various directions, the fingerprint may be quickly and smoothly extracted the background.

In addition, since the fingerprint is extracted using an image, there is no fear of damage to a sample, and since the fingerprint is extracted based on machine learning, the fingerprint may be extracted regardless of the formation time of the fingerprint.

Hereinafter, a method of generating a learning data set corresponding to an object of machine learning according to embodiments of the present disclosure will be described in detail with reference to FIGS. 2 to 6.

Figure 2:
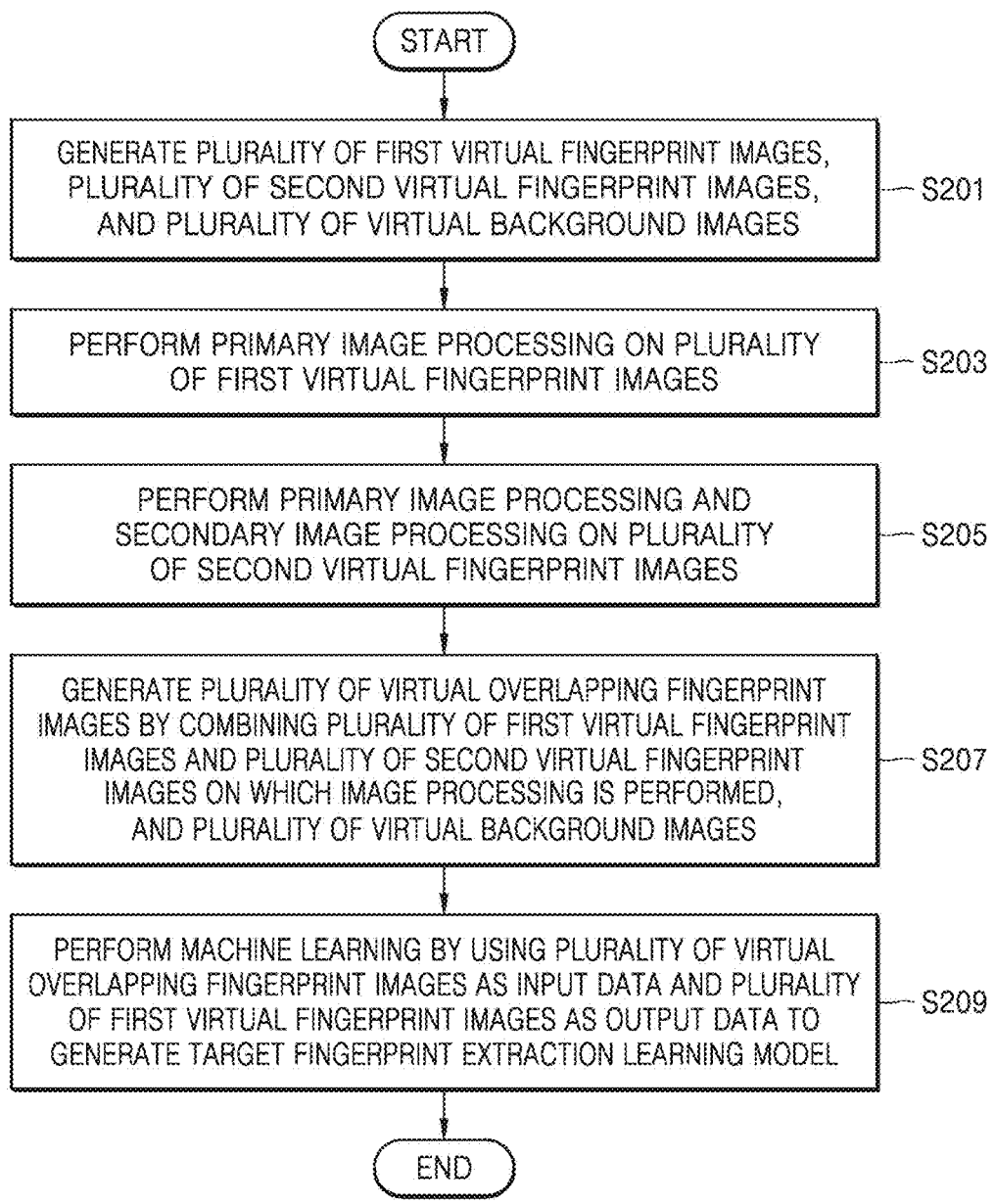
FIG. 2 is a flowchart illustrating a method of generating a target fingerprint extraction learning model according to an embodiment of the present disclosure.

FIG. 2 is a flowchart illustrating a method of generating a target fingerprint extraction learning model according to an embodiment of the present disclosure.

Figure 3:
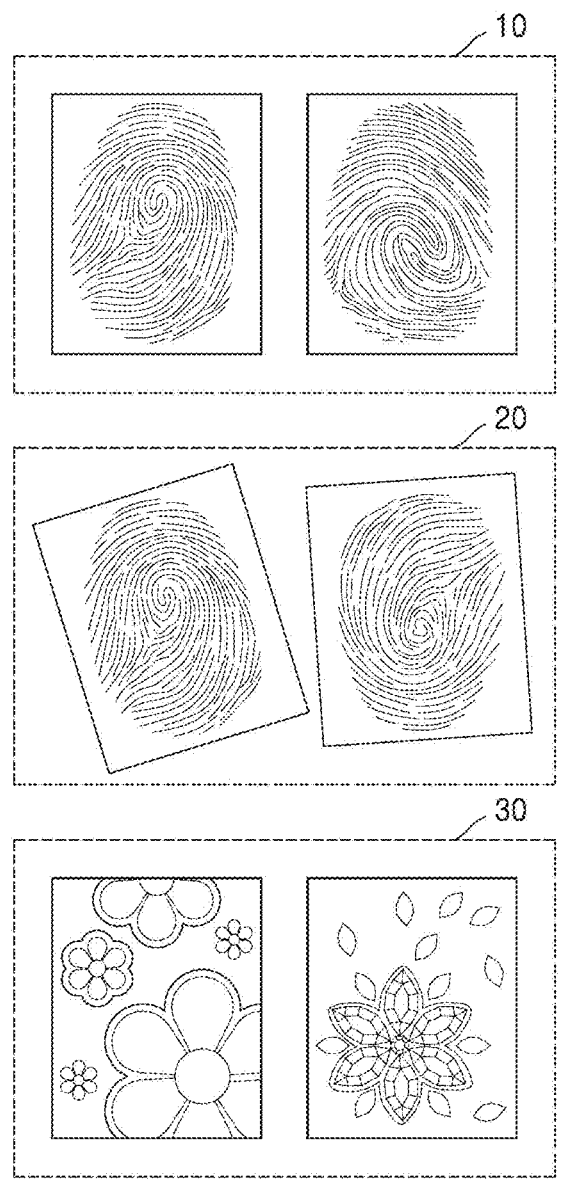
FIG. 3 is a diagram illustrating first and second virtual fingerprint images and virtual background images according to an embodiment of the present disclosure.

FIG. 3 is a diagram illustrating first and second virtual fingerprint images and virtual background images according to an embodiment of the present disclosure.

Figure 4:
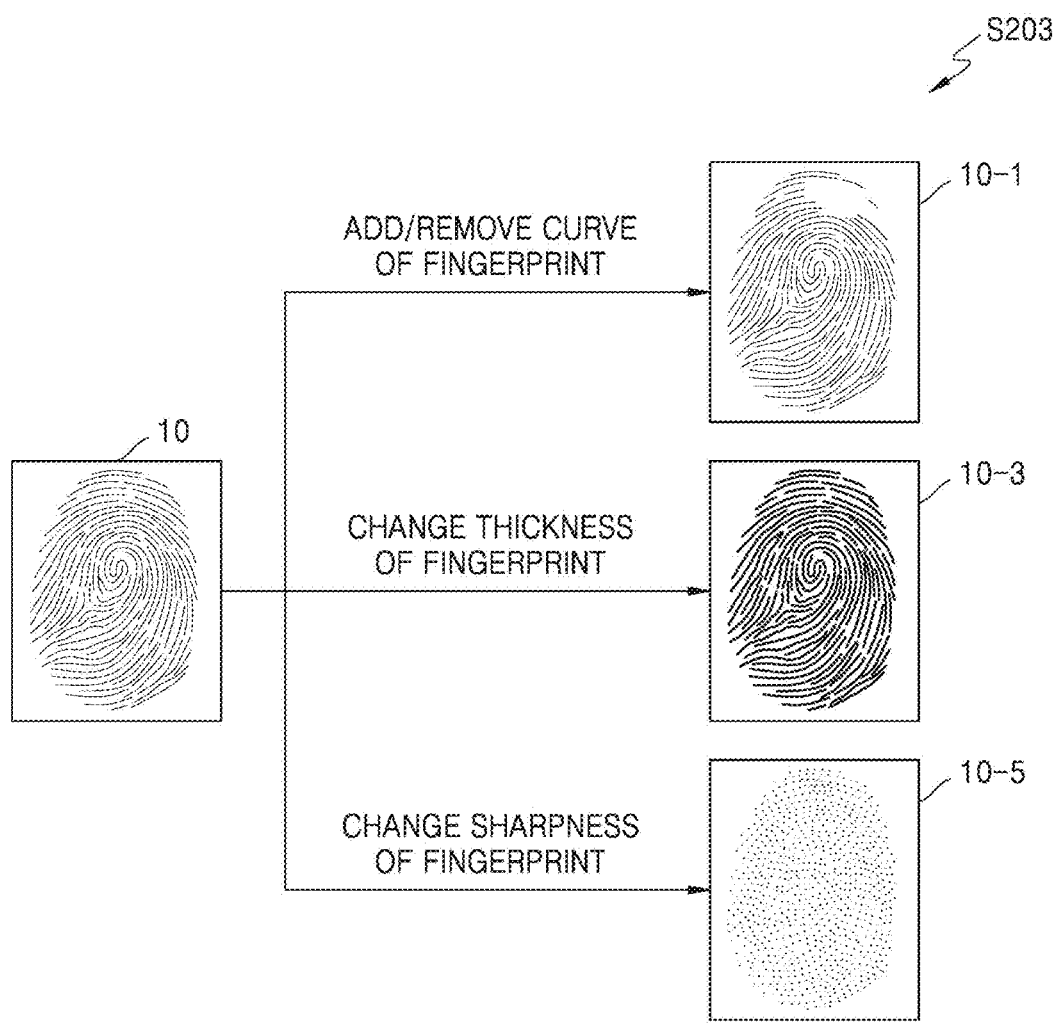
FIG. 4 is a diagram illustrating a primary image processing method according to an embodiment of the present disclosure.

FIG. 4 is a diagram illustrating a primary image processing method according to an embodiment of the present disclosure.

Figure 5:
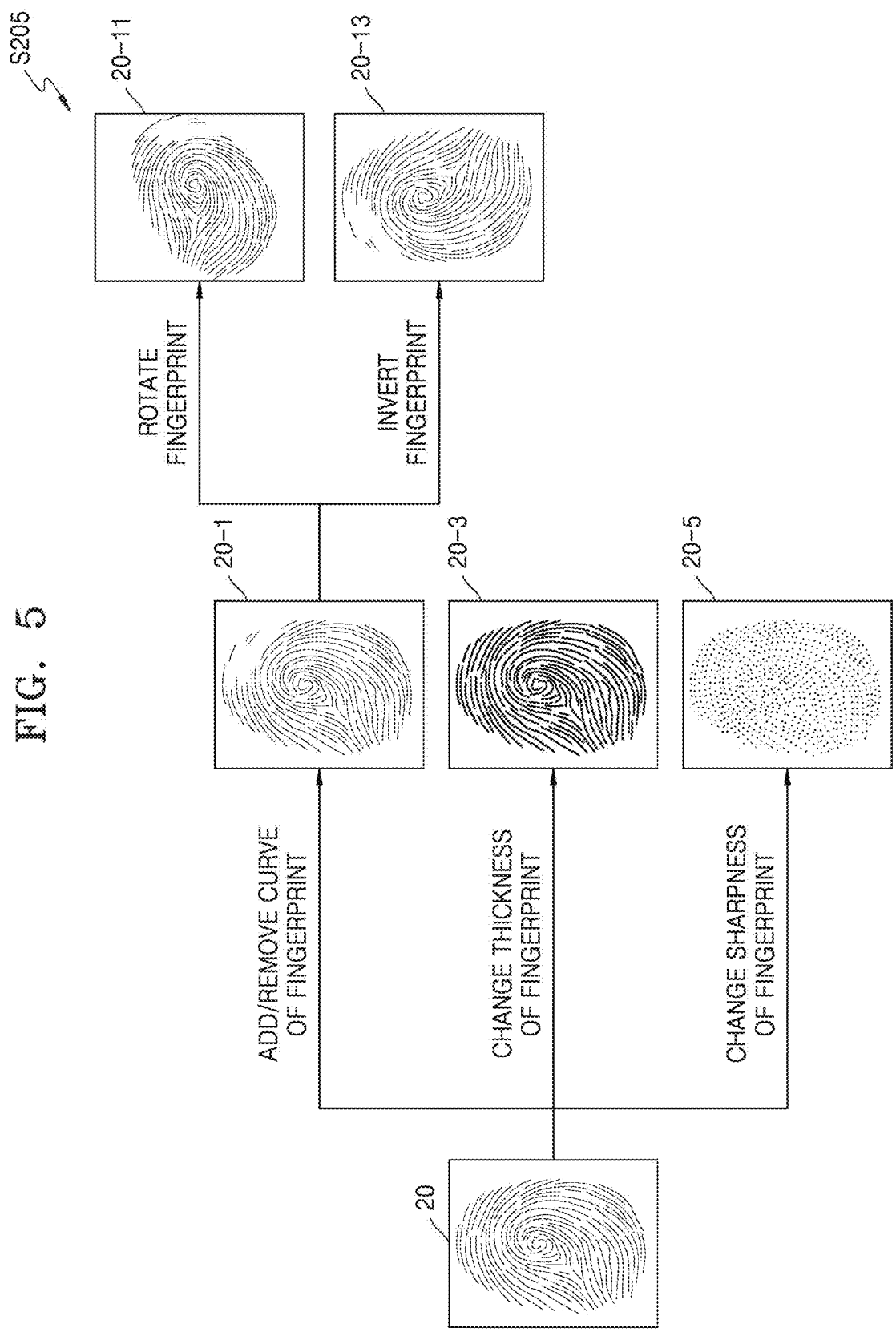
FIG. 5 is a diagram illustrating primary and secondary image processing methods according to an embodiment of the present disclosure.

FIG. 5 is a diagram illustrating primary and secondary image processing methods according to an embodiment of the present disclosure.

Figure 6:
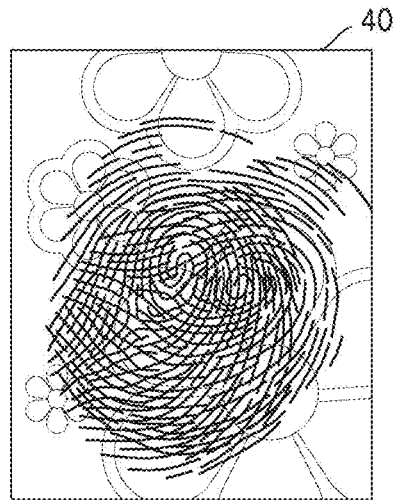
FIG. 6 is a flowchart illustrating a virtual overlapped fingerprint image according to an embodiment of the present disclosure.

FIG. 6 is a flowchart illustrating a virtual overlapped fingerprint image according to an embodiment of the present disclosure.

Referring to FIGS. 2 and 3, the fingerprint generation module 110 generates a plurality of first virtual fingerprint images 10 including a fingerprint located vertically on the center of each image, a plurality of second virtual fingerprint images 20 different from the plurality of first virtual fingerprint images 10, and a plurality of virtual background images 30 (S201).

The plurality of second virtual fingerprint images 20 may be different from the plurality of first virtual fingerprint images 10 in that the plurality of second virtual fingerprint images 20 include a fingerprint that is not located on the center of each image or is not located vertically on each image.

Meanwhile, the fingerprint generation module 110 performs primary image processing on the plurality of first virtual fingerprint images 10 (S203). The fingerprint generation module 110 may perform primary image processing on all or some of the plurality of first virtual fingerprint images 10.

Referring to FIGS. 4, the fingerprint generation module 110 may generate, for example, a first virtual fingerprint image 10-1 on which image processing is performed such that the bending of the fingerprint is added and/or removed with respect to the first virtual fingerprint image 10.

The fingerprint generation module 110 may generate, for example, a first virtual fingerprint image 10-3 on which image processing is performed such that the thickness of the fingerprint is changed with respect to the first virtual fingerprint image 10.

The fingerprint generation module 110 may generate, for example, a first virtual fingerprint image 10-5 on which image processing is performed such that the sharpness of the fingerprint is changed with respect to the first virtual fingerprint image 10.

Referring to FIGS. 2 and 3 again, the fingerprint generation module 110 may perform at least one of primary image processing and secondary image processing on the plurality of second virtual fingerprint images 20 (S205).

Referring to FIG. 5, the fingerprint generation module 110 may generate, for example, a second virtual fingerprint image 20-1 on which image processing is performed such that the bending of the fingerprint is added and/or removed, a second virtual fingerprint image 20-3 on which image processing is performed such that the thickness of the fingerprint is changed, and a second virtual fingerprint image 20-5 on which image processing is performed such that the sharpness of the fingerprint is changed, with respect to the second virtual fingerprint image 20.

Subsequently, the fingerprint generation module 110 may generate, for example, a second virtual fingerprint image 20-11 on which image processing is performed such that the fingerprint rotates clockwise or counterclockwise at a predetermined angle and a second virtual fingerprint image 20-13 on which image processing is performed such that the fingerprint is inverted left and right or up and down, with respect to the second virtual fingerprint image 20-1 on which image processing is performed such that the bending of the fingerprint is added and/or removed.

Although not shown, the fingerprint generation module 110 may generate, for example, a second virtual fingerprint image on which image processing is performed such that the fingerprint rotates clockwise or counterclockwise at a predetermined angle and a second virtual fingerprint image on which image processing is performed such that the fingerprint is inverted left and right or up and down, with respect to the second virtual fingerprint image 20-3 on which image processing is performed such that the thickness of the fingerprint is changed.

Although not shown, the fingerprint generation module 110 may generate, for example, a second virtual fingerprint image on which image processing is performed such that the fingerprint rotates clockwise or counterclockwise at a predetermined angle and a second virtual fingerprint image on which image processing is performed such that the fingerprint is inverted left and right or up and down, with respect to the second virtual fingerprint image 20-5 on which image processing is performed such that the sharpness of the fingerprint is changed.

Although not shown, the fingerprint generation module 110 may generate, for example, a second virtual fingerprint image on which image processing is performed such that the fingerprint rotates clockwise or counterclockwise at a predetermined angle and a second virtual fingerprint image on which image processing is performed such that the fingerprint is inverted left and right or up and down, with respect to the second virtual fingerprint image 20.

Referring to FIGS. 2 and 3 again, the fingerprint generation module 110 may generate a plurality of virtual overlapped fingerprint images by combining the plurality of first virtual fingerprint images on which primary image processing is performed, the plurality of second virtual fingerprint images on which at least one of primary image processing and secondary image processing is performed, and the plurality of virtual background images (S207).

Referring to FIGS. 4 to 6, for example, the fingerprint generation module 110 may generate a virtual overlapped fingerprint image 40 by combining any one of the first virtual fingerprint image 10-1 on which image processing is performed such that the bending of the fingerprint is added and/or removed, the first virtual fingerprint image 10-3 on which image processing is performed such that the thickness of the fingerprint is changed, and the first virtual fingerprint image 10-5 on which image processing is performed such that the sharpness of the fingerprint is changed, any one of the second virtual fingerprint image 20-11 on which image processing is performed such that the fingerprint rotates clockwise or counterclockwise at a predetermined angle with respect to the second virtual fingerprint image 20-1 on which image processing is performed such that the bending of the fingerprint is added and/or removed and the second virtual fingerprint image 20-13 on which image processing is performed such that the fingerprint is inverted left and right or up and down, with respect to the second virtual fingerprint image 20-1 on which image processing is performed such that the bending of the fingerprint is added and/or removed, and any one of the plurality of virtual background images 30.

Meanwhile, the first virtual fingerprint image 10 and the virtual overlapped fingerprint image 40 may constitute the learning data set.

Referring again to FIGS. 2 and 3, the machine learning module 130 performs machine learning by using the plurality of virtual overlapped fingerprint images 40 (FIG. 6) as input data and the plurality of first virtual fingerprint images 10 as output data to generate the target fingerprint extraction learning model (S209).

That is, the machine learning module 130 may repeatedly perform machine learning on a plurality of learning data sets by a deep learning algorithm to generate the target fingerprint extraction learning model.

According to the present embodiments, a clearer target fingerprint may be extracted by using a learning model generated through machine learning having an excellent effect on image processing such as pattern recognition, pattern restoration, pattern separation, etc.

Hereinafter, a fingerprint extraction method according to embodiments of the present disclosure will be described in detail with reference to FIGS. 7 and 8.

Figure 7:
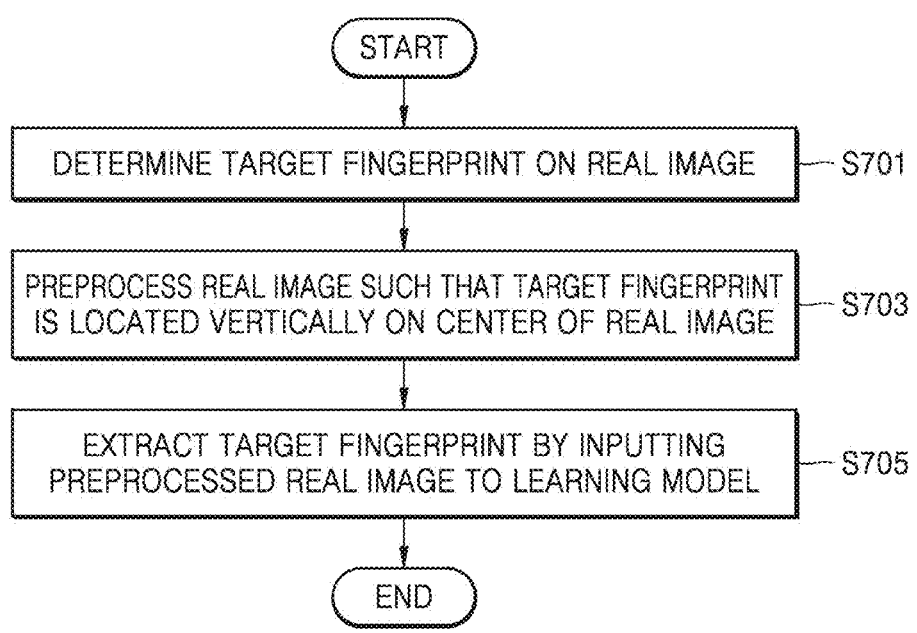
FIG. 7 is a flowchart illustrating a target fingerprint extraction method using a target fingerprint extraction learning model, according to an embodiment of the present disclosure.

FIG. 7 is a flowchart illustrating a target fingerprint extraction method using a target fingerprint extraction learning model according to an embodiment of the present disclosure.

Figure 8:
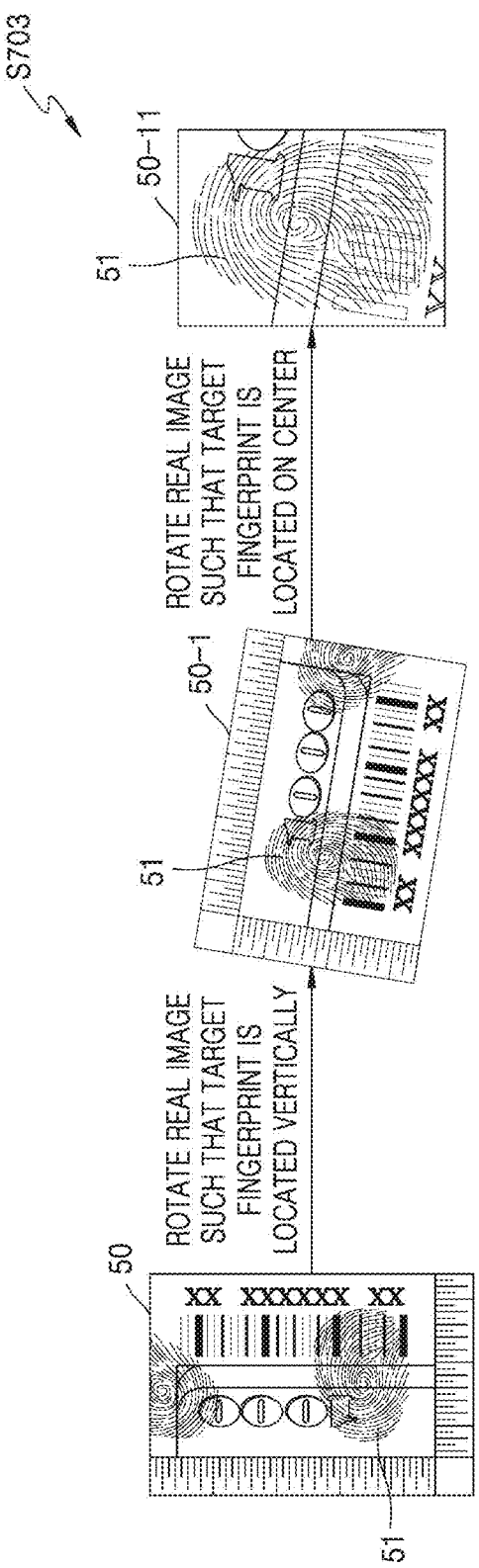
FIG. 8 is a diagram illustrating a real image pre-processing method according to an embodiment of the present disclosure.

FIG. 8 is a diagram illustrating a real image pre-processing method according to an embodiment of the present disclosure.

Referring to FIGS. 7 and 8, the fingerprint extraction module 150 determines a target fingerprint 51 from a real image 50 (S701), and pre-processes the real image 50 such that the target fingerprint 51 is located vertically on the center of the real image 50 (S703).

For example, the fingerprint extraction module 150 may generate a real image 50-11 that is cropped such that the target fingerprint 51 is located on the center, with respect to a real image 50-1 that rotates such that the target fingerprint 51 of the real image 50 is located vertically.

Subsequently, the fingerprint extraction module 150 may input a pre-processed real image, for example, the real image 50-11 that rotates and is cropped such that the target fingerprint 51 is vertically located on the center, into a learning model generated by the machine learning module 130 to extract the target fingerprint 51 (S705).

According to the present embodiments, the target fingerprint 51 may be more quickly and accurately extracted by inputting a real image pre-processed to be vertically located on the center of the image in the learning model that is machine-trained to extract the fingerprint vertically located on the center of the image.

The present embodiments may be used not only to separate and/or extract a predetermined fingerprint from overlapped fingerprints collected at a crime scene, but also may be widely applied to overall fingerprint recognition technology. For example, when a fingerprint recognition panel of a smart device is contaminated with the existing user's fingerprint or fingerprints of others, the present embodiments may be applied to separate and/or extract a newly recognized fingerprint from the existing contaminated fingerprint, but are not limited thereto.

Up to now, the present disclosure has been focused on preferred embodiments. It will be understood by one of ordinary skill in the art that various changes in form and details may be made therein without departing from the spirit and scope of the invention as defined by the appended claims.

Therefore, the disclosed methods should be considered from an illustrative point of view, not from a restrictive point of view. The scope of the present disclosure is defined by the appended claims rather than by the foregoing description, and all differences within the scope of equivalents thereof should be construed as being included in the present disclosure.

The invention claimed is:

1. A fingerprint extraction apparatus comprising:
a fingerprint generation module configured to generate at least one first virtual fingerprint image comprising a fingerprint located vertically on a center of an image, and a plurality of second virtual fingerprint images different from the at least one first virtual fingerprint image, perform primary image processing on the at least one first virtual fingerprint image, perform primary image processing and secondary image processing on each of the plurality of second virtual fingerprint images, and combine the at least one first virtual fingerprint image on which the primary image processing is performed and the plurality of second virtual fingerprint images on which the at least one of primary image processing and secondary image processing is performed to generate a plurality of virtual overlapped fingerprint images;
a machine learning module configured to generate a learning model for extracting a target fingerprint by performing machine learning using the plurality of virtual overlapped fingerprint images as input data and the at least one first virtual fingerprint image as output data; and
a fingerprint extraction module configured to extract a fingerprint located vertically on a center of a real image by inputting the real image to the learning model,
wherein the primary image processing comprises image processing on a curve forming a fingerprint, and the secondary image processing comprises image processing on a location of the fingerprint in the image, and
wherein the primary image processing further comprises at least one of adding a curve of the fingerprint, removing a curve of the fingerprint, and changing a thickness of the fingerprint, and the secondary image processing comprises at least one of rotating the fingerprint and inverting the fingerprint.

2. The fingerprint extraction apparatus of claim 1, wherein the fingerprint generation module is further configured to generate a plurality of virtual background images, and generate a plurality of virtual overlapped fingerprint images by combining the at least one first virtual fingerprint image on which the primary image processing is performed, the plurality of second virtual fingerprint images on which the at least one of primary image processing and secondary image processing is performed, and the plurality of virtual background images, and
wherein each of the plurality of virtual background images comprises at least one pattern other than the fingerprint.

3. The fingerprint extraction apparatus of claim 1, wherein each of the plurality of second virtual fingerprint images comprises a fingerprint that is not located on the center of the image or is not located vertically on the image.

4. The fingerprint extraction apparatus of claim 1, wherein a shape of the fingerprint included in each of the plurality of second virtual fingerprint images is different from a shape of the fingerprint included in the at least one first virtual fingerprint image.

5. The fingerprint extraction apparatus of claim 1, wherein a shape of the fingerprint included in each of the plurality of second virtual fingerprint images is the same as a shape of the fingerprint included in the at least one first virtual fingerprint image.

6. The fingerprint extraction apparatus of claim 1, wherein the fingerprint extraction module is further configured to determine a target fingerprint from the real image, pre-process the real image such that the target fingerprint is vertically located on the center of the real image, and input the pre-processed real image into the learning model to extract the target fingerprint.

7. A fingerprint extraction method comprising:
generating at least one first virtual fingerprint image comprising a fingerprint located vertically on a center of an image;
generating a plurality of second virtual fingerprint images different from the at least one first virtual fingerprint image;
performing primary image processing on the at least one first virtual fingerprint image;
performing primary image processing and secondary image processing on each of the plurality of second virtual fingerprint images;
generating a plurality of virtual overlapped fingerprint images by combining the at least one first virtual fingerprint image on which the primary image processing is performed and the plurality of second virtual fingerprint images on which the at least one of primary image processing and secondary image processing is performed;
generating a learning model for extracting a target fingerprint by performing machine learning using the plurality of virtual overlapped fingerprint images as input data and the at least one first virtual fingerprint image as output data; and
extracting a fingerprint located vertically on a center of a real image by inputting the real image to the learning model,
wherein the primary image processing comprises image processing on a curve forming a fingerprint, and the secondary image processing comprises image processing on a location of the fingerprint in the image, and
wherein the primary image processing further comprises at least one of adding a curve of the fingerprint, removing a curve of the fingerprint, and changing a thickness of the fingerprint, and the secondary image processing comprises at least one of rotating the fingerprint and inverting the fingerprint.

8. The fingerprint extraction method of claim 7, further comprising generating a plurality of virtual background images,
wherein the generating of the plurality of virtual overlapped fingerprint images comprises generating the plurality of virtual overlapped fingerprint images by combining the at least one first virtual fingerprint image on which the primary image processing is performed, the plurality of second virtual fingerprint images on which the at least one of primary image processing and secondary image processing is performed, and the plurality of virtual background images, and
wherein each of the plurality of virtual background images comprises at least one pattern other than the fingerprint.

9. The fingerprint extraction method of claim 7, wherein each of the plurality of second virtual fingerprint images comprises a fingerprint that is not located on the center of the image or is not located vertically on the image.

10. The fingerprint extraction method of claim 7, wherein a shape of the fingerprint included in each of the plurality of second virtual fingerprint images is different from a shape of the fingerprint included in the at least one first virtual fingerprint image.

11. The fingerprint extraction method of claim 7, wherein a shape of the fingerprint included in each of the plurality of second virtual fingerprint images is the same as a shape of the fingerprint included in the at least one first virtual fingerprint image.

12. The fingerprint extraction method of claim 7, wherein the extracting of the fingerprint comprises:
determining a target fingerprint from the real image;
pre-processing the real image such that the target fingerprint is vertically located on the center of the real image; and
inputting the pre-processed real image into the learning model to extract the target fingerprint.

* * * * *